US010915159B2

(12) United States Patent
Hu et al.

(10) Patent No.: US 10,915,159 B2
(45) Date of Patent: Feb. 9, 2021

(54) METHOD OF CONTROLLING A VEHICLE TO ADJUST PERCEPTION SYSTEM ENERGY USAGE

(71) Applicant: GM GLOBAL TECHNOLOGY OPERATIONS LLC, Detroit, MI (US)

(72) Inventors: Yiran Hu, Shelby Township, MI (US); Steven E. Muldoon, Royal Oak, MI (US); Wei Tong, Troy, MI (US); Shige Wang, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 290 days.

(21) Appl. No.: 15/944,003

(22) Filed: Apr. 3, 2018

(65) Prior Publication Data

US 2019/0302877 A1 Oct. 3, 2019

(51) Int. Cl.
| | | |
|---|---|---|
| *G01M 17/00* | (2006.01) | |
| *G06F 7/00* | (2006.01) | |
| *G06F 11/30* | (2006.01) | |
| *G07C 5/00* | (2006.01) | |
| *G06F 1/3287* | (2019.01) | |
| *G06F 17/00* | (2019.01) | |

(52) U.S. Cl.
CPC .......... *G06F 1/3287* (2013.01); *G07C 5/008* (2013.01)

(58) Field of Classification Search
CPC .............................. G06F 1/3287; G07C 5/008
USPC ....................................... 701/29.1, 521, 52.1
See application file for complete search history.

(56) References Cited

U.S. PATENT DOCUMENTS

| | | | |
|---|---|---|---|
| 2014/0164555 A1* | 6/2014 | Followell | G07C 5/0808 709/217 |
| 2016/0169692 A1* | 6/2016 | Gupta | G01C 21/3469 701/521 |
| 2019/0100212 A1* | 4/2019 | Oh | G08G 1/0112 |

\* cited by examiner

*Primary Examiner* — Mahmoud S Ismail
(74) *Attorney, Agent, or Firm* — Quinn IP Law

(57) ABSTRACT

A method of controlling a vehicle includes determining a current operating situation of the vehicle, and identifying a subset of a plurality of sensors of the vehicle needed to provide data to enable a vehicle control function for the current operating situation of the vehicle. A remainder of the plurality of sensors is disengaged to reduce electric energy usage by the vehicle while the vehicle is operating in the current operating situation of the vehicle. A sampling rate for the selected subset of sensors may be reduced to further reduce energy usage of the vehicle. Additionally, an energy reduction processing strategy may be implemented to reduce a processor frequency or a voltage of a computing device used to provide the vehicle control function to further reduce energy usage of the vehicle.

14 Claims, 2 Drawing Sheets

METHOD OF CONTROLLING A VEHICLE TO ADJUST PERCEPTION SYSTEM ENERGY USAGE

GOVERNMENT FUNDING

This invention was made with Government support under Agreement No. DE-AR0000790 awarded by the Department Of Energy. The Government may have certain rights in the invention.

INTRODUCTION

The disclosure generally relates to a method and system for controlling a vehicle to adjust perception system energy usage.

Many vehicles are equipped with systems that provide a vehicle control function. Examples of vehicle control functions may include, but are not limited to, a lane assist feature that warns the driver that the vehicle is crossing a lane line and/or maintains the vehicle within a driving lane, a stop assist feature that warns the driver of an obstacle in the roadway or automatically engages the braking system to slow the vehicle, a cruise control assist feature that automatically reduces speed to maintain a pre-determined free distance in front of the vehicle. Additionally, the vehicle control functions may be implemented in a semi-autonomous vehicle or a fully autonomous vehicle, which are capable of controlling most or all control operations of the vehicle with no or minimal input from the operator. The vehicle control functions may include functions that assist an operator of the vehicle, or may include functions associated with partial or complete control of the vehicle, such as may be implemented for semi or full autonomous vehicle operation.

These various different vehicle control functions require many different onboard vehicle sensors and computing devices to implement. The sensors and associated computing devices may be referred to as a perception system, because they are used to perceive the surroundings of the vehicle. These sensors and computing devices of the perception system require electric energy to operate. The draw of electric energy to operate the perception system may be significant, and may negatively affect the fuel efficiency of vehicles powered by an internal combustion engine, or the range of vehicles powered by an electric powertrain.

SUMMARY

A method of controlling a vehicle is provided. The method includes determining a current operating situation of the vehicle with a computing device of the vehicle. The computing device then identifies a subset of a plurality of sensors of the vehicle, which are used to provide data to enable a vehicle control function for the current operating situation of the vehicle. The computing device then disengages a remainder of the plurality of sensors to reduce electric energy usage by the vehicle.

In one aspect of the method of controlling the vehicle, the computing device re-engages the remainder of the plurality of sensors when the current operating situation of the vehicle changes.

In another aspect of the method of controlling the vehicle, the computing device may select a reduced energy processing strategy for a processor of the computing device. The reduced energy processing strategy reduces electric energy usage of the computing device while providing the vehicle control function for the current operating situation of the vehicle. The reduced energy processing strategy may include, but is not limited to, one of a reduction in a frequency of the processor of the computing device, or a reduction in a voltage of the processor of the computing device. Once the reduced energy processing strategy has been selected, the computing device changes from an initial or base processing strategy to the reduced energy processing strategy. The computing device changes from the reduced energy processing strategy back to the base processing strategy when the current operating situation of the vehicle changes.

In another aspect of the method of controlling the vehicle, the computing device is electronically connected with a non-vehicle-based device to communicate data to the vehicle related to the current operating situation of the vehicle. The non-vehicle based device may include, but is not limited to, a traffic signal, a traffic sign, another vehicle, etc. The computing device may then estimate a future change in the operating situation of the vehicle based on the data communicated to the vehicle from the non-vehicle-based device. The computing device may then be controlled to change from the reduced energy processing strategy to the base processing strategy prior to the occurrence of the estimated future change in the operating situation of the vehicle.

In another aspect of the method of controlling the vehicle, the computing device is electronically connected with a vehicle-based system to communicate data to the vehicle related to the current operating situation of the vehicle. The vehicle based system may include, but is not limited to, a transmission control module, an engine control module, a braking control module, etc. The computing device may use the data from the vehicle-based system to select the subset of the plurality of sensors and/or select the reduced energy processing strategy.

In one embodiment of the method of controlling the vehicle, the computing device may select a reduced sampling rate for the identified subset of the plurality sensors. The reduced sampling rate decreases the frequency at which the sensors gather data, thereby reducing their energy draw. The computing device may then control the subset of the sensors to operate at the reduced sampling rate.

In one aspect of the method of controlling the vehicle, the step of determining the current operating situation of the vehicle may include classifying the current operating situation of the vehicle into one of a discrete number of operating situations. The current one of the discrete number of operating situations may then be used to select the subset of sensors and/or the reduced energy processing strategy.

A vehicle is also provided. The vehicle includes a plurality of sensors, and a computing device connected to the plurality of sensors. The computing device includes a processor and a memory having a perception system energy reduction algorithm stored thereon. The processor is operable to execute the perception system energy reduction algorithm to receive data from the plurality of sensors. The perception system energy reduction algorithm identifies which one of a discrete number of operating situations the vehicle is currently operating in, and defines the identified operating situation as a current operating situation of the vehicle. A subset of the plurality of sensors is identified to provide data to enable a vehicle control function for the current operating situation of the vehicle. A remainder of the plurality of sensors is disengaged to reduce electric energy usage by the vehicle. The perception system energy reduction algorithm may also select a reduced energy processing strategy for the processor of the computing device. The reduced energy processing strategy reduces electric energy usage of the computing device while providing the vehicle control function for the current operating situation of the vehicle. The computing device is controlled to change from a base processing strategy to the reduced energy processing strategy. When the current operating situation of the vehicle changes to another one of the discrete number of operating situations, the remainder of the plurality of sensors are re-engaged, and the computing device is controlled to change from the reduced energy processing strategy back to the base processing strategy.

In another aspect of the vehicle, the processor is operable to execute the perception system energy reduction algorithm to select a sampling rate for the identified subset of the plurality sensors, and control the subset of the plurality of sensors to operate at the selected sampling rate.

In another aspect of the vehicle, the processor is operable to execute the perception system energy reduction algorithm to electronically connect to a vehicle-based control system to receive data therefrom, regarding the current operating situation of the vehicle. In addition, the computing device may electronically connect with a non-vehicle-based device to communicate data to the computing device related to the current operating situation of the vehicle. The computing device may then estimate a future change in the operating situation of the vehicle based on the data communicated to the vehicle from the non-vehicle-based device and/or the vehicle-based control system, and change from the reduced energy processing strategy to the base processing strategy, as well as re-engaged the remainder of the sensors, prior to the occurrence of the estimated future change in the operating situation of the vehicle.

Accordingly, the system and the process described herein reduces the amount of energy used by the vehicle to operate the sensors and the computing unit for the perception system, based on the current operating situation of the vehicle. This reduces the total amount of electrical energy required to operate the vehicle, which may improve fuel efficiency of the vehicle when powered by an internal combustion engine, or may extend the driving range of the vehicle when powered by an electric powertrain.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
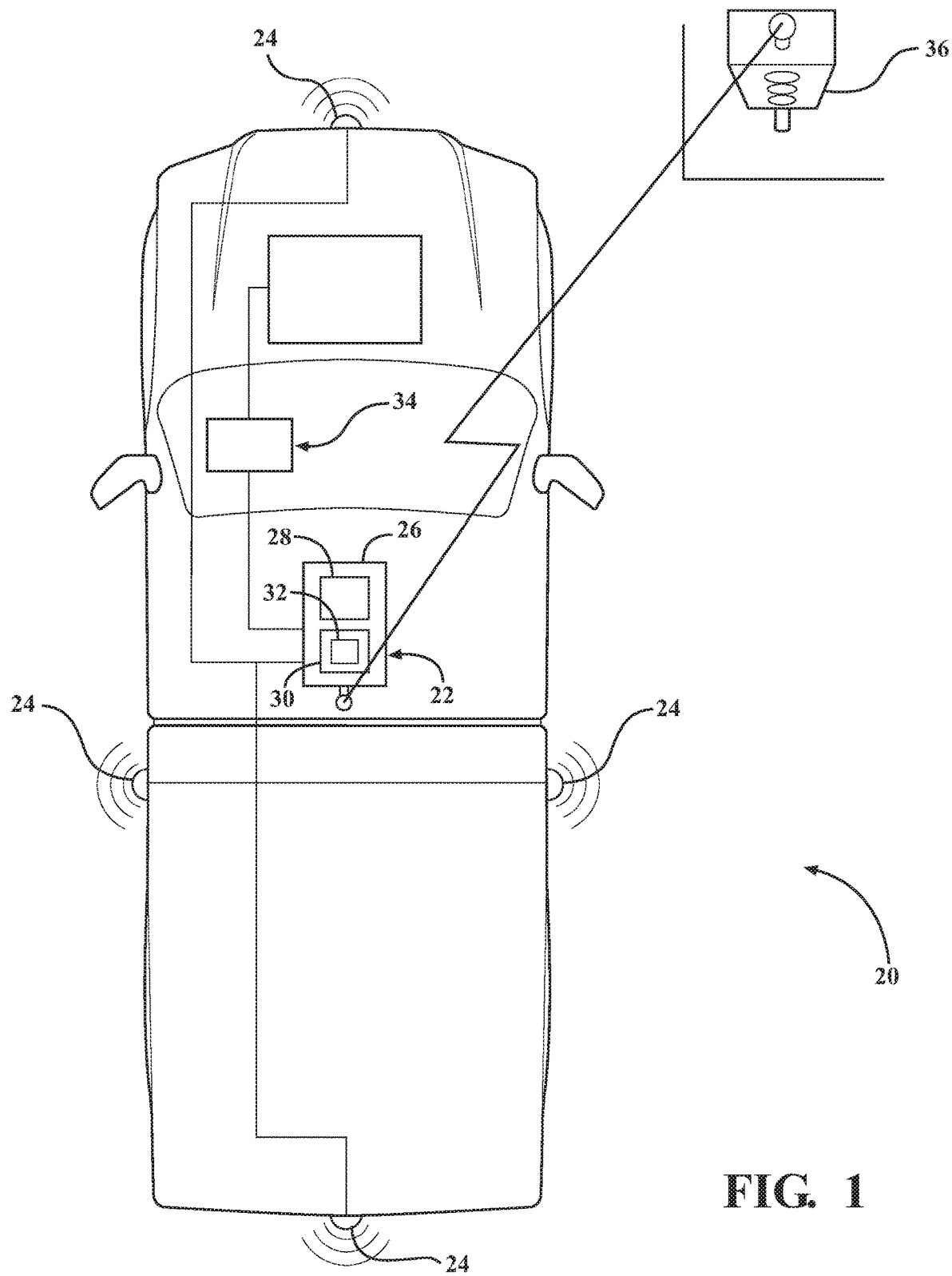
FIG. 1 is a schematic plan view of a vehicle showing a perception system.

Referring to the FIGS., wherein like numerals indicate like parts throughout the several views, a vehicle is generally shown at 20 in FIG. 1. The vehicle 20 may be configured as any type of moveable platform, including but not limited to, a car, a truck, a van, a bus, a train, a plane, a boat, an ATV, etc.

Referring to FIG. 1, the vehicle 20 includes a perception system 22. The perception system 22 includes a plurality of sensors 24 mounted on the vehicle 20, and a computing device 26. The plurality of sensors 24 may include, but are not limited to, one or more cameras, one or more Light Detection And Ranging (Lidar) devices, one or more radar devices, or some other type of sensor 24. The sensors 24 are used to gather data related to the environment surrounding the vehicle 20 and/or movement of the vehicle 20. The specific type, style and number of sensors 24 is not pertinent to the teachings of this disclosure, and are therefore not described in detail herein.

The computing device 26 is connected to the sensors 24, and is operable to receive the data gathered from the sensors 24. The computing device 26 is operable to use the data gathered from the sensors 24 to implement one or more vehicle control functions. The vehicle control functions may include, but are not limited to, a lane assist feature that warns the driver that the vehicle 20 is crossing a lane line and/or maintains the vehicle 20 within a driving lane, a stop assist feature that warns the driver of an obstacle in the roadway or automatically engages the braking system to slow the vehicle 20, a cruise control assist feature that automatically reduces speed to maintain a pre-determined free distance in front of the vehicle 20. Additionally, the vehicle 20 may include a semi-autonomous vehicle or a fully autonomous vehicle, which are capable of controlling most or all control operations of the vehicle 20 with minimal or no input from the operator. Accordingly, it should be appreciated that the vehicle control functions may include the functions required for the vehicle to operate in a partial autonomous mode or a fully autonomous mode. The specific operation performed by the vehicle control function, and the manner in which the computing device 26 uses the data from the sensors 24 to execute the vehicle control function is not pertinent to the teachings of this disclosure, and are therefore not described in detail herein.

Each of the plurality of sensors 24 and the computing device 26 of the perception system 22 require electrical energy to operate. The draw of electrical energy from these devices may be significant. If the vehicle 20 is powered by an internal combustion engine, the internal combustion engine must supply power to a power generating device, such as an alternator or generator, in order to provide the required electrical power for the perception system 22. The power required to generate the electrical energy for the perception system 22 reduces the fuel efficiency of the vehicle 20. If the vehicle 20 is powered by an electric powertrain, which uses electric energy stored in an energy storage device, such as a battery, then the energy storage device must use some of the electrical energy stored therein to power the perception system 22, thereby reducing a driving range of the vehicle 20. Accordingly, the detailed description herein provides a method and a system for reducing the amount of electrical energy used to operate the perception system 22 of the vehicle 20.

The computing device 26 may be referred to as a control module, a control unit, a controller, a vehicle 20 controller, a computer, etc. The computing device 26 is operable to control the operation of one or more systems of the vehicle 20 to implement the vehicle control function. The computing device 26 includes at least one processor 28, and may include all software, hardware, memory 30, algorithms, connections, sensors 24, etc., necessary to implement the vehicle control function. As such, a method, described below, may be embodied as a program or algorithm that is operable on the computing device 26. It should be appreciated that the computing device 26 may include any device capable of analyzing data from various sensors 24, comparing data, making the necessary decisions required to execute the vehicle control functions, and executing the required tasks necessary to control the operation of the vehicle 20 to implement the vehicle control functions.

The computing device 26 may be embodied as one or multiple digital computers or host machines each having one or more processors 28, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 30 may include a non-transitory/tangible medium which participates in providing data or computer-readable instructions. Memory may be non-volatile or volatile. Non-volatile media may include, for example, optical or magnetic disks and other persistent memory. Exemplary volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The computing device 26 includes tangible, non-transitory memory 30 on which are recorded computer-executable instructions, including a perception system energy reduction algorithm 32. The processor 28 of the computing device 26 is configured for executing the perception system energy reduction algorithm 32. The perception system energy reduction algorithm 32 implements a method of controlling the vehicle 20 to reduce electric energy usage by the vehicle 20 based on a current driving situation of the vehicle 20.

Figure 2:
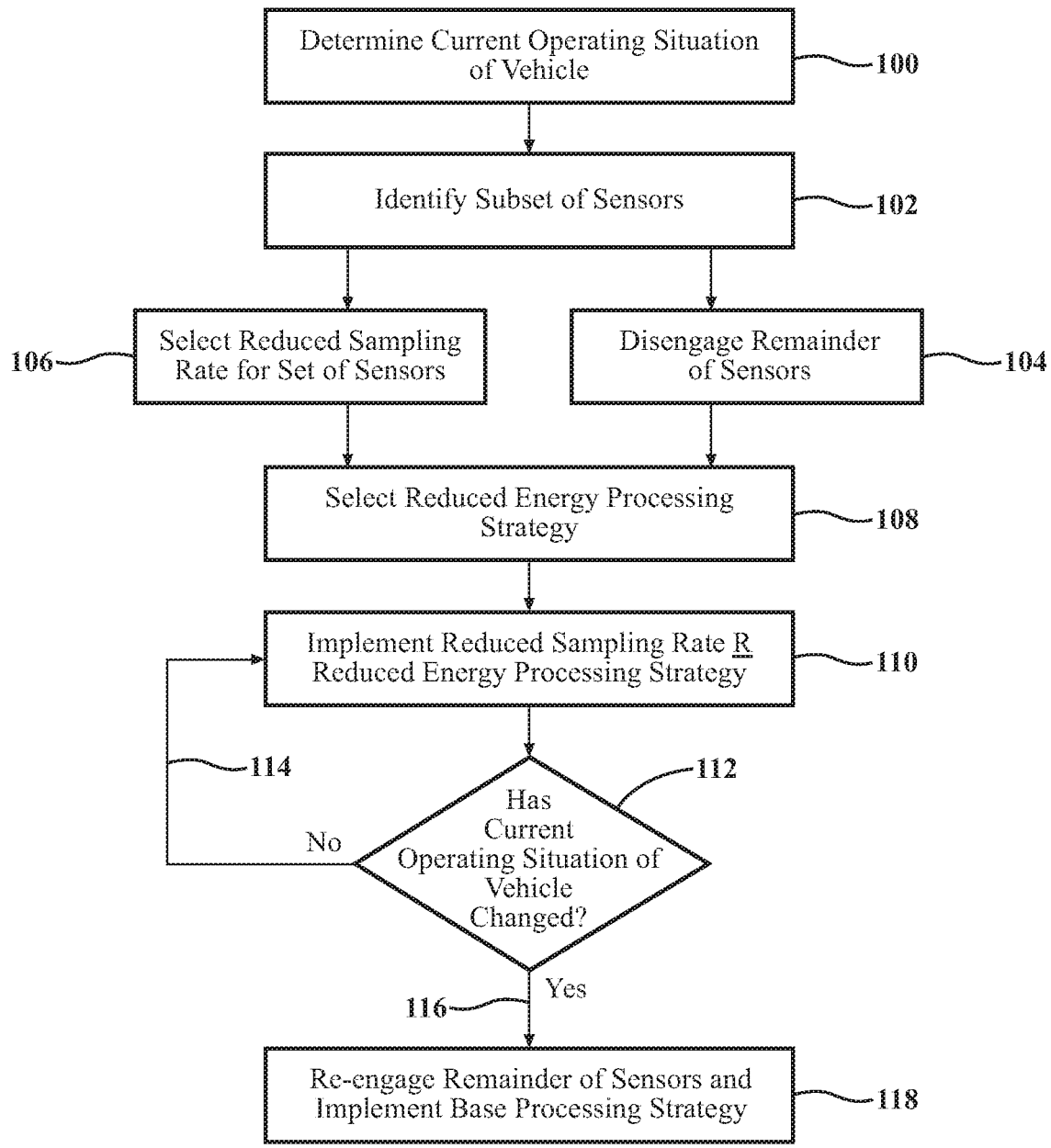
FIG. 2 is a flowchart representing a method of controlling the vehicle.

Referring to FIG. 2, the method of controlling the vehicle 20 includes determining a current operating situation of the vehicle 20. The step of determining the current operating situation of the vehicle 20 is generally indicated by box 100 in FIG. 2. The current operating situation of the vehicle 20 may be defined based the current condition or value of one or more operating parameters. The computing device 26 may determine the current operating situation of the vehicle 20 in a suitable manner, using data gathered from the one or more vehicle-based systems 34, as well as data gathered from one or more of the sensors 24 of the vehicle 20. The current operating situation may be defined as one of a discrete number of operating situations. As such, the computing device 26 may classify the current conditions of the vehicle 20 into one of the discrete number of operating situations. For example, the discrete number of operating situations may include, but are not limited to, a general driving situation, an expressway driving situation, an urban driving situation, a night driving situation, a day driving situation, a congested traffic situation, a traffic light situation, etc. The computing device 26 may analyze data from different sources, and determine which one of the discrete number of driving situations the current vehicle 20 conditions best correspond to. The computing device 26 may then define that driving situation as the current operating situation of the vehicle 20. It should be appreciated that the computing device 26 may determine the current operating situation of the vehicle 20 in some other manner not described herein.

Different driving situations of the vehicle 20 may render certain vehicle control functions unnecessary. For example, if the vehicle 20 is stationary at a traffic light, it may not be necessary for the perception system 22 to operate long range radar, nor may it be necessary for the perception system 22 to continually monitor and assess the position of the vehicle 20 within a driving lane. However, autonomous vehicles, when stationary at a traffic light, may continue to monitor nearby traffic and identify a change in the traffic light in order to determine when to disengage the braking system and advance the vehicle 20. Accordingly, for certain driving situations, one or more sensors 24 may be deactivated, and the computing device 26 may be controlled to operate under a reduced energy processing strategy to reduce the amount of electrical energy used by the vehicle 20 while operating in those certain driving situations.

Once the current driving situation of the vehicle 20 has been determined, the computing device 26 identifies a subset of the sensors 24 of the vehicle 20 that may be needed or required in order to provide data that enables a specific vehicle control function for the current operating situation of the vehicle 20. The step of identifying the subset of sensors 24 is generally indicated by box 102 in FIG. 2. For example, if the current driving situation is best defined as stationary at a traffic light, then the computing device 26 may select the sensors 24 necessary to sense the condition of the traffic light, such as one or more forward facing cameras. It should be appreciated that the computing device 26 may provide several different vehicle control functions, and that several of the different vehicle control functions may be applicable to any given driving situation. As such, it should be appreciated that the computing device 26 identifies all of the sensors 24 that may be required to provide all of the possible vehicle control functions for the current operating situation of the vehicle 20. As such, the subset of sensors 24 identified by the computing device 26 may be used to gather data for all of the possible vehicle control functions for the current operating situation of the vehicle 20. A remainder of the sensors 24, i.e., the sensors 24 that are not part of the subset of sensors 24 identified by the computing device 26 for the current operating situation of the vehicle 20, may not be needed to provide the vehicle control functions for the current operating situation of the vehicle 20.

The computing device 26 may identify the subset of sensors 24 in a suitable manner. For example, the computing device 26 may have a respective pre-defined subset of sensors 24 for each different operating situation. As such, once the current operating situation is defined, the subset of sensors 24 may be identified. In other embodiments, the computing device 26 may identify the subset of sensors 24 based on other factors. For example, the computing device 26 may electronically connect with another vehicle-based system 34 to communicate data to the computing device 26 related to the current operating situation of the vehicle 20. The other vehicle-based systems 34 may include, but are not limited to, an engine control module, a transmission control module, a vehicle 20 orientation module, etc. The computing device 26 may receive data from one or more of the other vehicle-based systems 34, and use that data to identify the subset of sensors 24 for the current operating situation of the vehicle 20. For example, if the computing device 26 receives data from another vehicle-based system 34, such as a gyroscope or other orientation sensor 24, that the vehicle 20 is climbing a steep hill, then the computing device 26 may determine that forward facing cameras may be positioned to view over the horizon, and determine that such forward facing cameras are not needed for the current orientation of the vehicle 20. As such, the computing device 26 may determine that those forward facing cameras are not included in the subset of sensors 24. In another example, if the vehicle 20 is descending a hill, the computing device 26 may determine that a rooftop mounted camera may be best positioned to view the roadway in front of the vehicle 20, and may include that roof top camera in the identified subset of sensors 24.

Once the computing device 26 has identified the subset of sensors 24, and the remainder of the sensors 24, the computing device 26 may then disengage the remainder of the plurality of sensors 24 to reduce electric energy usage by the vehicle 20. The step of disengaging the remainder of the sensors 24 is generally indicated by box 104 in FIG. 2. Because only the identified subset of sensors 24 are to be used to gather data for the vehicle control functions for the current driving situation of the vehicle 20, the remainder of the sensors 24 are not needed, and may be turned off, i.e., disengaged to save energy, while the vehicle 20 is operating in the current operating situation. It should be appreciated that operation of the identified subset of sensors 24 is maintained to continue to gather data, while the remainder of the sensors 24 are disengaged.

In addition to disengaging the remainder of the sensors 24 not necessary for gathering data during the current driving situation of the vehicle 20, the computing device 26 may further select a reduced sampling rate for the identified subset of the plurality sensors 24. The step of selecting the reduced sampling rate for the subset of sensors 24 is generally indicated by box 106 in FIG. 2. For some operating situations, the identified subset of sensors 24 may be necessary, but they may only need to be operated at a fraction of the normal operating frequency for that specific operating situation. For example, while the vehicle 20 is stopped at a traffic light, the computing device 26 may reduce the frequency at which lateral sensors 24 gather data. Accordingly, the sampling rate may be reduced accordingly. If the computing device 26 selects a reduced sampling rate for the identified subset of sensors 24, then the computing device 26 may control the subset of sensors 24 to operate at the reduced sampling rate while the vehicle 20 is under the current operating situation. Reducing the sampling frequency of the subset of sensors 24 reduces the number of operation cycles per unit time, which reduces the amount of electrical energy the subset of sensors 24 uses during that unit time.

The computing device 26 may further select a reduced energy processing strategy for the processor 28 of the computing device 26. The step of selecting the reduced energy processing strategy is generally indicated by box 108 in FIG. 2. The reduced energy processing strategy reduces electric energy usage of the computing device 26 while providing the vehicle control functions for the current operating situation of the vehicle 20. The reduced energy processing strategy may include an operating strategy for the processor 28 that reduces the amount of electrical energy required to perform the required tasks for the current operating situation of the vehicle 20. For example, the reduced energy processing strategy may include, but is not limited to, a reduction in a frequency of the processor 28 of the computing device 26, or a reduction in a voltage of the processor 28 of the computing device 26. It should be appreciated that the reduced energy processing strategy may include some other strategy for controlling the processor 28 that reduces electrical energy usage while the vehicle 20 is operating in the current operating situation. Once the computing device 26 has selected a reduced energy processing strategy, then the computing device 26 may control the processor 28 to change from an initial or base processing strategy to the reduced energy processing strategy. The reduced energy processing strategy may be maintained while the vehicle 20 is operating in the current operating situation. The step of implementing the reduced sampling rate for the subset of sensors 24 and the reduced energy processing strategy is generally indicated by box 110 in FIG. 2.

The computing device 26 monitors the operation of the vehicle 20 to determine if the current operating situation of the vehicle 20 has changed. The step of determining if the current operating situation of the vehicle 20 has changed is generally indicated by box 112 in FIG. 2. If the current operating situation of the vehicle 20 has not changed, generally indicated at 114, then the computing device 26 maintains the disengagement of the remainder of the sensors 24, maintains the reduced sampling rate for the subset of the sensors 24, and maintains the reduced energy processing strategy.

When the current operating situation of the vehicle 20 changes, generally indicated at 116, the computing device 26 may re-engage the remainder of the sensors 24, and may control the processor 28 of the computing device 26 to change from the reduced energy processing strategy to the initial, base processing strategy, generally indicated by box 118. As described above, the current operating situation of the vehicle 20 may be defined as one of the discrete number of operating situations. Accordingly, when the conditions under which the vehicle 20 is currently operating no longer match the defined current operating situation of the vehicle 20, the computing device 26 may change or re-define the current operating situation of the vehicle 20 to one of the discrete number of operating situations that best match the current conditions. When the computing unit changes or re-defines the current operating situation of the vehicle 20, then the identified subset of sensors 24, the reduced sampling rate for the sensors 24, and/or the reduced energy processing strategy may no longer be valid for the re-defined current operating situation of the vehicle 20, and these parameters may be reset. For example, if the vehicle 20 is traveling on an expressway, then the current operating situation of the vehicle 20 may be determined to be expressway driving situation. Upon the vehicle 20 exiting the expressway, the current driving situation of the vehicle 20 may be re-defined or changed to that of an urban driving situation or a rural driving situation. The subset of sensors 24 required for the vehicle control functions when operating on an expressway may vary from the subset of sensors 24 required for the vehicle control functions when operating in an urban environment. Additionally, a different subset of sensors 24 may require a different sampling rate and/or a different reduced energy processing strategy. Accordingly, when the computing device 26 determines that the current operating situation of the vehicle 20 changes, the computing device 26 may reengage the remainder of the sensors 24, control all of the sensors 24 to the full sampling rate, and return control of the processor 28 to the base processing strategy, until a new subset of sensors 24, a new reduced sampling rate, and a new reduced energy processing strategy for the new current operating situation of the vehicle 20 may be defined and implemented.

The computing device 26 may identify a change in the current operating situation of the vehicle 20 in a suitable manner. For example, the computing device 26 may make this determination based entirely on data gathered by the sensors 24 of the vehicle 20, and/or on data from the other vehicle 20-based control systems of the vehicle 20. Additionally, the computing unit may electronically connect with a non-vehicle-based device 36 to communicate data to the vehicle 20 related to the current operating situation of the vehicle 20. For example, it is contemplated that certain devices, such as stop lights, traffic message boards, etc., may broadcast data to vehicles in the area. The computing device 26 may connect with the devices to receive the data therefrom. For example, if the vehicle 20 is stopped at a traffic light, the computing device 26 may connect with a traffic light, and receive information regarding the time at which the traffic light will change signals and allow traffic to move. The computing device 26 may use the data communicated to the vehicle 20 from the non-vehicle-based device 36 to estimate a future change in the operating situation of the vehicle 20, and may change from the reduced energy processing strategy to the base processing strategy, and may reengage the remainder of the sensors 24, prior to the occurrence of the estimated future change in the operating situation of the vehicle 20. Accordingly, the data from the non-vehicle-based device 36 may enable the computing device 26 to anticipate a change in the current operating situation of the vehicle 20, and prepare the perception system 22 accordingly.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of controlling a vehicle, the method comprising:
    determining a current operating situation of the vehicle with a computing device of the vehicle;
    identifying a subset of a plurality of sensors of the vehicle to provide data to enable a vehicle control function for the current operating situation of the vehicle, with the computing device, wherein the vehicle control function includes one of a lane assist, a stop assist, or a cruise control assist;
    electronically connecting the computing device with a non-vehicle-based device to communicate data to the vehicle related to the current operating situation of the vehicle;
    estimating a future change in the operating situation of the vehicle based on the data communicated to the vehicle from the non-vehicle-based device;
    selecting, via the computing device, a reduced energy processing strategy for a processor of the computing device, wherein the reduced energy processing strategy reduces electric energy usage of the computing device responsive to the vehicle control function for the current operating situation of the vehicle;
    controlling the computing device to change from a base processing strategy to the reduced energy processing strategy, including controlling the computing device to change from the reduced energy processing strategy to the base processing strategy prior to the occurrence of the estimated future change in the operating situation of the vehicle; and
    disengaging a remainder of the plurality of sensors, with the computing device, to reduce electric energy usage by the vehicle.

2. The method set forth in claim 1, further comprising re-engaging the remainder of the plurality of sensors, with the computing device, when the current operating situation of the vehicle changes.

3. The method set forth in claim 1, further comprising controlling the computing device to change from the reduced energy processing strategy to the base processing strategy when the current operating situation of the vehicle changes.

4. The method set forth in claim 1, wherein selecting the reduced energy processing strategy includes one of a reduction in a frequency of the processor of the computing device, or a reduction in a voltage of the processor of the computing device.

5. The method set forth in claim 1, further comprising electronically connecting the computing device with a vehicle-based system to communicate data to the vehicle related to the current operating situation of the vehicle.

6. The method set forth in claim 5, wherein identifying the subset of the plurality of sensors is further defined as identifying the subset of the plurality of sensors based on data from the vehicle-based system.

7. The method set forth in claim 1, further comprising the step of selecting a reduced sampling rate for the identified subset of the plurality sensors.

8. The method set forth in claim 7, further comprising controlling the subset of the plurality of sensors to operate at the reduced sampling rate.

9. The method set forth in claim 1, wherein determining the current operating situation of the vehicle is further defined as determining which one of a discrete number of operating situations the vehicle is currently operating in.

10. A method of controlling a vehicle having a plurality of sensors and a computing device having a processor operable to provide a vehicle control function, wherein the vehicle control function includes one of a lane assist, a stop assist, or a cruise control assist, the method comprising:
    identifying which one of a discrete number of operating situations the vehicle is currently operating in, and defining the identified operating situation as a current operating situation of the vehicle, with the computing device;
    identifying a subset of the plurality of sensors to provide data to enable the vehicle control function for the current operating situation of the vehicle, with the computing device;
    selecting a sampling rate for the identified subset of the plurality sensors, with the computing device;
    controlling the subset of the plurality of sensors to operate at the selected sampling rate, with the computing device;
    disengaging a remainder of the plurality of sensors, with the computing device, to reduce electric energy usage by the vehicle;
    selecting a reduced energy processing strategy for the processor of the computing device, wherein the reduced energy processing strategy reduces electric energy usage of the computing device while providing the vehicle control function for the current operating situation of the vehicle;

estimating a future change in the operating situation of the vehicle based on the data communicated to the vehicle from the non-vehicle-based device;

controlling the computing device to change from a base processing strategy to the reduced energy processing strategy, including controlling the computing device to change from the reduced energy processing strategy to the base processing strategy prior to the occurrence of the estimated future change in the operating situation of the vehicle; and re-engaging the remainder of the plurality of sensors and controlling the computing device to change from the reduced energy processing strategy to the base processing strategy, with the computing device, when the current operating situation of the vehicle changes to another one of the discrete number of operating situations.

11. The method set forth in claim 10, further comprising electronically connecting the computing device to a non-vehicle-based device to communicate data to the computing device related to the current operating situation of the vehicle.

12. A vehicle comprising:
a plurality of sensors;
a computing device connected to the plurality of sensors, wherein the computing device includes a processor and a memory having a perception system energy reduction algorithm stored thereon, wherein the processor is operable to execute the perception system energy reduction algorithm to:
  receive data from the plurality of sensors;
  identify which one of a discrete number of operating situations the vehicle is currently operating in, and define the identified operating situation as a current operating situation of the vehicle;
  identify a subset of the plurality of sensors to provide data to enable a vehicle control function for the current operating situation of the vehicle;
  disengage a remainder of the plurality of sensors to reduce electric energy usage by the vehicle;
  select a reduced energy processing strategy for the processor of the computing device, wherein the reduced energy processing strategy reduces electric energy usage of the computing device while providing the vehicle control function for the current operating situation of the vehicle;
  control the computing device to change from a base processing strategy to the reduced energy processing strategy;
  re-engage the remainder of the plurality of sensors and control the computing device to change from the reduced energy processing strategy to the base processing strategy when the current operating situation of the vehicle changes to another one of the discrete number of operating situations;
  electronically connect the computing device with a non-vehicle-based device to communicate data to the computing device related to the current operating situation of the vehicle;
  estimate a future change in the operating situation of the vehicle based on the data communicated to the vehicle from the non-vehicle-based device; and
  control the computing device to change from the reduced energy processing strategy to the base processing strategy prior to the occurrence of the estimated future change in the operating situation of the vehicle.

13. The vehicle set forth in claim 12, further comprising a vehicle-based control system for controlling a vehicle subsystem, and wherein the computing device is connected to the vehicle-based control system to receive data therefrom.

14. The vehicle set forth in claim 12, wherein the processor is operable to execute the perception system energy reduction algorithm to:
  select a sampling rate for the identified subset of the plurality sensors; and
  control the subset of the plurality of sensors to operate at the selected sampling rate.

* * * * *